(12) United States Patent
Swart et al.

(10) Patent No.: US 8,239,861 B2
(45) Date of Patent: Aug. 7, 2012

(54) SOFTWARE-BASED UNLOADING AND RELOADING OF AN INACTIVE FUNCTION TO REDUCE MEMORY USAGE OF A DATA PROCESSING TASK PERFORMED USING A VIRTUAL MACHINE

(75) Inventors: Riaan Swart, Cambridge (GB);
Rodolph Gérard Jacques Ascanio Jean-Denis Perfetta, Cambridge (GB);
David John Butcher, Norfolk (GB)

(73) Assignee: ARM Limited, Cambridge (GB)

( * ) Notice: Subject to any disclaimer, the term of this patent is extended or adjusted under 35 U.S.C. 154(b) by 1218 days.

(21) Appl. No.: 12/068,536

(22) Filed: Feb. 7, 2008

(65) Prior Publication Data
US 2009/0204963 A1 Aug. 13, 2009

(51) Int. Cl.
*G06F 9/455* (2006.01)
(52) U.S. Cl. .............................. 718/1; 707/813; 717/166
(58) Field of Classification Search .................. None
See application file for complete search history.

(56) References Cited

U.S. PATENT DOCUMENTS

| | | | | |
|---|---|---|---|---|
| 5,794,049 A * | 8/1998 | Lindholm | ...................... | 717/136 |
| 5,905,895 A * | 5/1999 | Halter | ........................... | 717/139 |
| 6,212,632 B1 * | 4/2001 | Surine et al. | ...................... | 713/2 |
| 6,430,570 B1 * | 8/2002 | Judge et al. | ...................... | 717/166 |
| 6,738,969 B2 * | 5/2004 | Bak et al. | ...................... | 717/158 |
| 6,851,112 B1 * | 2/2005 | Chapman | ........................... | 718/1 |
| 2008/0005190 A1 * | 1/2008 | Fey et al. | ...................... | 707/202 |

OTHER PUBLICATIONS

Szydlo, "Adaptive Software Architectures for Mobile Devices", Dept. of Computer Science, AGH University of Science and Technology, Jun. 29, 2005, pp. 1-108.*

* cited by examiner

*Primary Examiner* — David Huisman
(74) *Attorney, Agent, or Firm* — Nixon & Vanderhye P.C.

(57) ABSTRACT

A method of performing a processing task in a data processing apparatus is provided that reduces memory usage of the processing task. According to this method a Virtual Machine performs the steps of accessing platform-neutral program code in a function repository, executing the processing task on the Virtual Machine, and analysing at a current execution point, on a function-by-function basis, which functions in the function repository are inactive functions. The Virtual Machine performs software-based unloading from the function repository of at least a portion of platform-neutral program code corresponding to one or more inactive functions. A corresponding virtual machine and data processing apparatus are also provided.

29 Claims, 9 Drawing Sheets

The results are:

| Technique/app | EEMBC score | permanent heap size on app finish |
|---|---|---|
| No unloading/EEMBC in foreground | 127 595 | 495 976 bytes |
| No unloading/EEMBC in background | 152 548 | 430 372 bytes |
| Total running time | 2m 42.00s | |
| Unloading/EEMBC in foreground | 126 795 | 336 676 bytes |
| Unloading/EEMBC in background | 160 144 | 300 460 bytes |
| Total running time | 2m 53.42s | |

FIG. 9

SOFTWARE-BASED UNLOADING AND RELOADING OF AN INACTIVE FUNCTION TO REDUCE MEMORY USAGE OF A DATA PROCESSING TASK PERFORMED USING A VIRTUAL MACHINE

BACKGROUND OF THE INVENTION

1. Field of the Invention

The present invention relates to data processing. More particularly, the present invention relates to reducing memory usage of a data processing task being performed using a Virtual Machine associated with a data processing apparatus.

2. Description of the Prior Art

It is known to perform data processing tasks by executing platform-neutral program code on a Virtual Machine running on a data processing apparatus. The Virtual Machine provides an abstraction between the underlying computing hardware and the platform-neutral program code of the program application which is to be executed and thus provides greater portability of program code between different computer systems. It is also known to perform Dynamic Adaptive Compilation (DAC) of platform-neutral program code to platform-dependent program code, which enables compilation to be performed during the execution of program code and thus allows the compilation to take account of aspects of the virtual machine and underlying hardware and software. Known Dynamic Adaptive Compilers tend to interpret methods first, select the methods most worth compiling and perform compilation according to the current processing situation. Another known type of compilers used in processing systems having virtual machines are Just-in-Time (JIT) compilers. JIT compilers typically compile on a method-by-method basis just before a given method executes for the first time. Both DAC and JIT compilers can improve efficiency by avoiding individual bytecode by bytecode interpretation of the platform-neutral program code. Some such known compilers can unload compiled versions of program code (i.e. program code native to the host computer system), but always keeps the original bytecode version of the program instructions loaded in memory associated with the virtual machine. In the following description where reference is made to a "just-in-time" compiler, it should be assumed that a just-in-time compiler could have the properties of a JIT compiler, a DAC compiler as described above, or even both.

There is a trend towards production of ever smaller computing devices such as mobile phones and other handheld devices such as personal digital assistants. On such small devices data storage space is at a premium. The current lower bound for memory use of a program application at any point during execution of a data processing task is at least the storage capacity required to store all classes and associated methods or functions needed up to a current execution point. In the known Java Connected Limited Device Configuration (CLDC), classes cannot be unloaded from a Virtual Machine memory until the program application terminates. This is demanding on the limited memory resources of the host device. On the Java 2 Platform Standard Edition (J2SE), which is typically run on desktop computers, the Java 2 Platform Enterprise Edition (J2EE) version of the Virtual Machine (typically run on servers), and the Java 2 Micro Edition Connected Device Configuration (J2ME CDC), commonly used on small devices such as mobile phones, custom class loaders can be implemented and all classes loaded by the given class loader can be unloaded in their entirety. However, in these known Virtual Machines (J2SE, J2EE and J2ME CDC) unloading of a class is only possible if the class was loaded by a custom class loader and if no other program code needs to use the class loader any more. In the event that nothing uses the class loader any more then all classes associated with the class loader are unloaded together with the class loader itself.

It is also known to provide a paging system to manage memory of a data processing apparatus. In such computer systems, a processor referring to a page that hasn't been loaded into memory generates a page fault that is intercepted and handled by specialised hardware (i.e. a Memory Management Unit). Thus, in known paging systems, features built into a special-purpose hardware model (i.e. page faults, virtual addressing and page attributes) enable unloading of data from a memory of the computer system.

There is a requirement to reduce the memory usage of processing tasks being performed using a Virtual Machine (e.g. while the corresponding processing applications are idle or in background mode) in a way that does not require special-purpose hardware to perform unloading of data yet efficiently reduces the memory footprint of program applications.

SUMMARY OF THE INVENTION

According to a first aspect the present invention provides a method of performing a processing task in a data processing apparatus reducing memory usage of said processing task, said processing task being performed using a virtual machine associated with said data processing apparatus, said processing task comprising at least one processing function, said method comprising said virtual machine performing the steps of:

(a) accessing platform-neutral program code corresponding to a representation of said at least one processing function in a function repository associated with said virtual machine;

(b) executing said processing task on said virtual machine using said platform-neutral program code;

(c) analysing at a current execution point said at least one processing function on a function-by-function basis to identify an inactive function; and (d) performing, using said virtual machine, software-based unloading from said function repository of at least a portion of platform-neutral program code corresponding to said inactive function.

The present invention recognises that by providing a function-by-function analysis to identify an inactive function associated with a processing task and by using the Virtual Machine to perform software-based unloading from the function repository of at least a portion of the platform-neutral program code corresponding to the inactive function, the memory footprint of the data processing application can be efficiently reduced. The present invention allows for more fine-grained unloading of platform-neutral program code since, for example, individual functions (methods) can be unloaded rather than having to substantially simultaneously unload all methods of a class and an associated custom class loader (as is the case for J2SE, J2EE and J2ME CDC Virtual Machines). Furthermore, the present invention allows platform-neutral program code for methods/functions (or portions thereof) to be unloaded even if the corresponding class is still in use by the system. The present technique provides an unloading mechanism that is implemented in software with potentially no run-time overhead of checking for unloaded code and, in contrast to paging systems, no hardware circuitry is needed to trigger page faults. Furthermore, the software-based unloading according to the present technique allows more fine-grained unloading of data than is possible in previously known paging systems where unloading is restricted to blocks of say 1024 or 4096 bytes. Instead individual functions/methods can be unloaded.

In will be appreciated that the unloaded portion of platform-neutral program code may never need to be executed again following unloading. However, in one embodiment a software-based reloading mechanism is provided for reloading of the unloaded portion of platform-neutral program code for execution of the inactive function by the virtual machine. Provision of a software-based reloading mechanism for reloading of the unloaded portion of platform-neutral program code for execution of the inactive function by the virtual machine enables the unloaded platform-neutral program code to be reloaded as and when required into the function repository (e.g. shortly before or upon execution. This provides the flexibility to unload functions (or portions thereof) even if they might be required at a subsequent execution point. In this way, the memory used by long-running idle applications can be readily reduced and reused more efficiently to accommodate currently active platform-neutral program code on the (same) virtual machine. Similarly, the software-based unloading can be used to reduce the memory usage of long running applications that are being maintained in background mode on the virtual machine.

Thus in a multi-application Virtual Machine it becomes possible to execute long-lived applications in a background mode rather than having to start them up and shut them down again in order to make available sufficient storage space in the function repository for currently executing applications. An example of such a long-running program application is an e-mail application that may live in the background maintaining a connection to a server and coming into the foreground mode only when the server notifies it that an e-mail has in fact been received.

It will be appreciated that the data processing apparatus may execute the platform-neutral program code in the form that was originally loaded into a function repository associated with the Virtual Machine. However, in one embodiment, the Virtual Machine comprises a run-time code modifier arranged to receive from the function repository platform-neutral program code corresponding to a given processing function and to generate modified platform-neutral program code for performing a given processing function and to store the modified platform-neutral program code in the function repository. The run-time code modifier could, for example, enable platform-neutral program code to be generated for a given processing function having improved efficiency relative to the originally loaded platform-neutral program code. Furthermore, either originally-loaded platform-neutral program code or modified versions of the platform-neutral program code may be unloaded by the software-based unloading mechanism.

It will be appreciated that the software-based unloading could comprise unloading of the originally loaded program code corresponding to a given processing function. However, in one embodiment the software-based unloading comprises unloading of at least a portion of the modified platform-neutral program code generated by the run-time code modifier.

It will be appreciated that the modified platform-neutral program code generated by the run-time code modifier could comprise any kind of modification of the input platform-neutral program code. However, in one embodiment the modified platform-neutral program code corresponds to a run-time optimised version of the corresponding processing function.

Although the function repository associated with a Virtual Machine in which a software-based unloading is performed could be a function repository external to the Virtual Machine, in one embodiment the function repository (where the loaded functions are stored) is an integral part of the Virtual Machine. This provides for a more convenient management of unloading from and reloading to the function repository.

The software-based unloading could comprise unloading of the platform-neutral program code corresponding to the inactive function to a portion of memory associated with the Virtual Machine, which is in a different region of the same memory in which the function repository is stored. However, in one embodiment, the software-based unloading comprises unloading to memory external to the Virtual Machine. It will be appreciated that the external memory could be any type of memory such as a general purpose Random Access Memory, but in one embodiment the external memory is flash memory.

In an alternative embodiment, the software-based unloading of the platform-neutral program code corresponding to the inactive function comprises unloading to an unloading-region of memory associated with the Virtual Machine, e.g. the unloading-region being in a different region of the same memory as the function repository. This makes the unloaded platform-neutral program code more readily accessible to the Virtual Machine yet still frees up space in the function repository for currently active platform-neutral program code. In one such embodiment where the unloading-region is a region of the same memory of the Virtual Machine in which the function repository is stored, the unloading region is a dynamically re-allocatable (or non-permanent) storage region of memory. This leaves more available storage space in the non dynamically re-allocatable (or permanent) storage region for platform-neutral program code corresponding to currently active program functions.

It will be appreciated that the software-based unloading could comprise unloading and storage of unaltered platform-neutral program code corresponding to the inactive program function or a portion thereof. However, in one embodiment, the software-based unloading comprises the step of compression of the portion of platform-neutral program code corresponding to the inactive function. Such compression can be readily initiated by the Virtual Machine and provides further improvement of efficiency of memory usage by reducing the memory footprint of unloaded platform-neutral program code.

It will be appreciated that the software-based unloading and/or the software-based reloading mechanism of the Virtual Machine could be implemented in any one of a number of different ways, such as by configuring a Virtual Machine such that it performs advance profiling (to determine whether or not a given function is likely to be invoked/executed in the near future) in order to decide whether or not to unload certain methods or functions. However, in one embodiment the data processing apparatus comprises an application manager associated with the Virtual Machine and the data processing apparatus is configured such that an Application Program Interface (API) between the Virtual Machine and the application manager is used to provide access to the software-based unloading. This allows the implementer of the application manager (e.g. a mobile phone vendor) to customise when the software-based unloading is performed based on knowledge about the execution patterns of particular program applications being run on the data processing apparatus. Thus an application manager can be written by, for example, a mobile phone vendor whilst the virtual machine can be provided by a different supplier and the API can be readily used to provide access to the unloading functionality. Thus the decision on whether or not to unload platform-neutral program code corresponding to inactive functions can be made by a party other than the supplier of the virtual machine.

It will be appreciated that the software-based unloading could be performed such that all of the platform-neutral program code associated with a given function (e.g. a Java method) is unloaded from the function repository. However, in one embodiment, the software-based unloading is performed such that a placeholder function corresponding to the inactive function is retained within the function repository following the software-based unloading. This simplifies implementation of the reloading mechanism since it enables the Virtual Machine to readily determine the characteristics of the unloaded platform-neutral program code and to more efficiently determine how to retrieve the unloaded platform-neutral program code upon or for invocation of the unloaded function.

In some such embodiments in which software-based unloading leaves a placeholder function within the function repository, the placeholder function comprises information for use in reloading platform-neutral program code of the inactive function. Retention of this information is space-efficient yet readily accessible and facilitates reloading of the platform-neutral program code.

It will be appreciated that the software-based reloading mechanism could comprise any one of a number of different implementations provided that reloading is achieved. However, in one embodiment, the placeholder function that is retained in the function repository following software-based unloading comprises a pointer to a reload function for reloading the unloaded portion of the inactive function. Effectively this replaces the unloaded platform-neutral program code with the reload function which makes reloading straightforward upon invocation of the inactive function.

It will be appreciated that the reload function could comprise compiled code or native code, but in one embodiment the reload function comprises platform-neutral program code. In one such embodiment in which the reload function comprises platform-neutral program code, the reload function comprises a single custom-defined bytecode for enabling the virtual machine to reload the unloaded portion of the inactive function. This makes for a compact yet efficient reload function.

In an alternative embodiment to the embodiment in which the reload function comprises platform-neutral program code, the reload function comprises a call to a native function comprising program code native to the data processing apparatus. This also represents an efficient way of providing a reloading mechanism.

It will be appreciated that the Virtual Machine could determine only when individual inactive functions corresponding to a given processing task have been unloaded. However in one embodiment, the Virtual Machine is configured to determine when performing the software-based unloading whether all functions of a class to which the inactive function corresponds have been unloaded. This enables further data associated with the class to be unloaded from the function repository without adversely affecting processing performance.

In one such embodiment where the Virtual Machine is configured to determine whether all functions of the class have been unloaded, the Virtual Machine is configured to initiate software-based unloading of class information corresponding to the unloaded functions. In some such embodiments the software-based reloading mechanism is configured to check whether the class information corresponding to said unloaded functions associated with the class is present in the function repository and to initiate reloading of the class information if the class information is determined not to be present in the function repository prior to execution of a corresponding unloaded function. This avoids retention of unnecessary data within the function repository and frees up further space within the function repository for use by currently active platform-neutral program code yet ensures that the class information is readily available upon subsequent execution of the unloaded function(s) and thus reduces the impact of unloading on processing efficiency.

In one such embodiment where class information associated with the unloaded function(s) is unloaded by the virtual machine and reloaded by the software-based reloading mechanism, the class information comprises a constant pool associated with the class. Unloading and reloading of the class constant pool is straightforward to implement.

In one embodiment the reloading mechanism is configured to automatically reload the unloaded portion of platform-neutral program code upon invocation of the inactive function at an execution point subsequent to the software-based unloading being performed. Since the unloaded platform-neutral program code is reloaded automatically when the unloaded function/method is next executed or invoked, no run-time check is needed to determine when to reload the method while it is not invoked, so there is no appreciable overhead while the function remains unloaded. The invokers themselves need not perform a check because the reloading is automatic.

It will be appreciated that the Virtual Machine could be configured to maintain a record only of unloaded platform-neutral program code or portions thereof associated with given processing functions and to trigger reloading before one of the functions in that list is executed. However, in one embodiment the Virtual Machine is configured to perform a check that a function associated with the function repository is currently loaded in the function repository prior to invoking the function. This provides a general safeguard against attempted execution of functions whose platform-neutral program code has not been loaded into the function repository and avoids the need for a record to be maintained of which functions have been unloaded.

It will be appreciated that the software-based reloading mechanism could retrieve a duplicate copy of an unloaded portion of platform-neutral program code or indeed an optimised version corresponding to the unloaded portion of platform-neutral program code. However, in one embodiment the software-based reloading mechanism is configured to retrieve the unloaded portion of platform-neutral program code and to replace the placeholder function with the retrieved code. This provides a convenient and efficient implementation of the reloading mechanism.

In one embodiment, the virtual machine is configured to perform the software-based unloading for at least a portion of platform-neutral program code corresponding to an entire inactive class having a plurality of inactive functions. Thus an entire inactive class can be unloaded without any requirement that a custom class loader and any other classes corresponding to that custom class loader also be unloaded. In one such embodiment the software-based reloading mechanism retrieves the unloaded portion of platform-neutral program code from a location corresponding to the location from which it was originally loaded into the function repository (e.g. flash memory or hard disk).

It will be appreciated that the virtual machine could be associated with one of a variety of different computer programming languages. However, in one embodiment, the virtual machine is a Java virtual machine and the platform-neutral program code comprises Java bytecodes.

According to a second aspect, the present invention provides a virtual machine arranged to perform a processing task having at least one processing function in a data processing apparatus whilst reducing memory usage of said processing task, said virtual machine comprising:
(a) function-repository accessing code for accessing platform-neutral program code corresponding to a representation of said at least one processing function in a function repository associated with said virtual machine;
(b) invoker code for invoking execution of said processing task on said virtual machine using said platform-neutral program code;
(c) analysis code for analysing, at a current execution point, said at least one processing function on a function-by-function basis to identify an inactive function; and
(d) function unloader code for performing software-based unloading from said function repository of at least a portion of platform-neutral program code corresponding to said inactive function.

According to a third aspect, the present invention provides a data processing apparatus for performing a processing task whilst reducing memory usage of said processing task, said processing task being performed using a virtual machine associated with said data processing apparatus, said processing task comprising at least one processing function, said apparatus comprising:
(a) accessing circuitry for accessing platform-neutral program code corresponding to a representation of said at least one processing function in a function repository associated with said virtual machine;
(b) execution circuitry for executing said processing task on said virtual machine using said platform-neutral program code;
(c) analysis circuitry for analysing at a current execution point said at least one processing function on a function-by-function basis to identify an inactive function; and
(d) unloading circuitry arranged to enable said virtual machine to perform unloading from said function repository of at least a portion of platform-neutral program code corresponding to said inactive function.

According to a fourth aspect, the present invention provides a data processing apparatus for performing a processing task whilst reducing memory usage of said processing task, said processing task being performed using a virtual machine associated with said data processing apparatus, said processing task comprising at least one processing function, said apparatus comprising:
(a) means for accessing platform-neutral program code corresponding to a representation of said at least one processing function in a function repository associated with said virtual machine;
(b) means for executing said processing task on said virtual machine using said platform-neutral program code;
(c) means for analysing at a current execution point said at least one processing function on a function-by-function basis to identify an inactive function; and
(d) means for enabling said virtual machine to perform unloading from said function repository of at least a portion of platform-neutral program code corresponding to said inactive function.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 shows benchmarking statistics from an implementation of an embodiment of the present invention.

DESCRIPTION OF THE PREFERRED EMBODIMENTS

Figure 1:
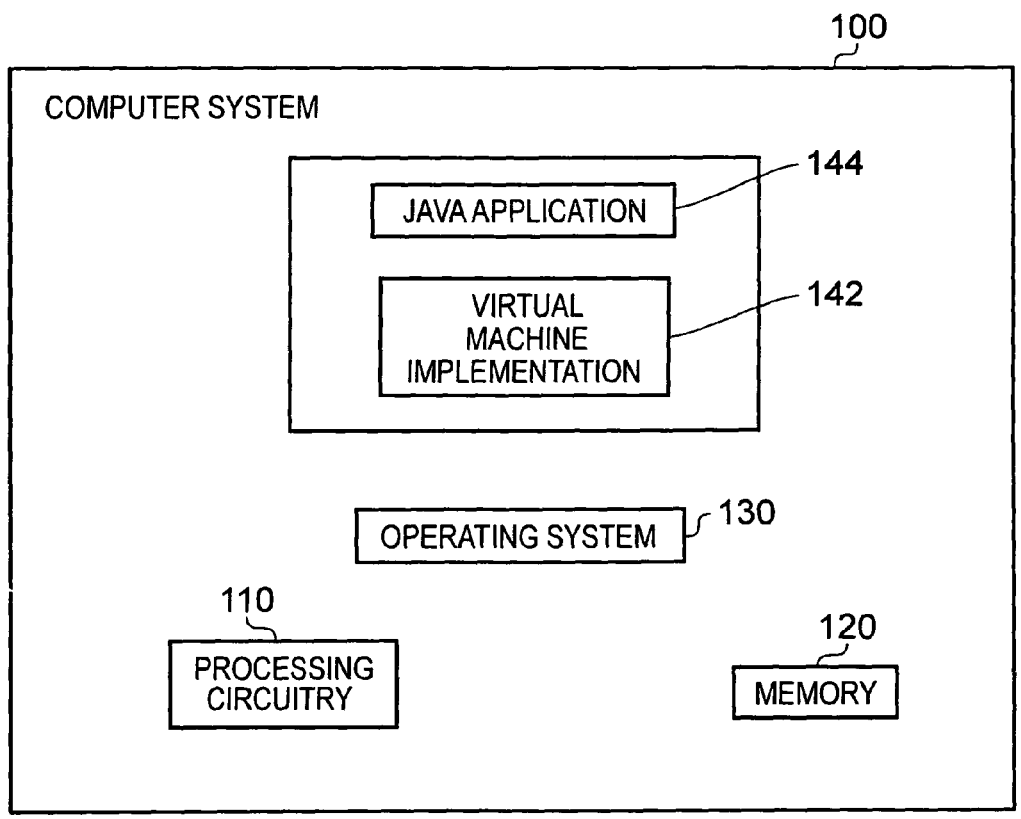
FIG. 1 schematically illustrates a computer system including processing circuitry which is used to execute software loaded into a memory.

FIG. 1 schematically illustrates a computer system 100 including processing circuitry 110 which is used to execute software loaded into a memory 120. The computer system 100 runs an operating system 130, on top of which is provided a Java Virtual Machine 142. The Java Virtual Machine 142 is software that runs on a computer system 100 and, from the point of view of the operating system 130, the Java Virtual Machine looks like a software application. However, the Java Virtual Machine 142 functions as a virtual operating system, supporting one or more Java applications such as a Java application 144 illustrated.

The Java Virtual Machine 142 interprets compiled Java binary code called bytecode for the processing circuitry 110 corresponding to a given hardware platform. The Java Virtual Machine 142 allows Java application programs to be run on any hardware platform without having to be rewritten or recompiled by the programmer for each separate hardware platform. The Java Virtual Machine 142 makes Java code portability possible because it includes information with regard to specific instruction lengths and other peculiarities of the host computer system 100. The Java Virtual Machine 142 is an abstract rather than a real physical machine or processor. The Java Virtual Machine 142 comprises a set of registers, a stack, a heap and a class storage area(not shown), which stores inter alfa method information and information about exceptions. The Java Virtual Machine 142 enables the Java application 144 to be executed on the computer system 100. The Java Virtual Machine 142 can either interpret the Java bytecode one instruction (i.e. bytecode) at a time thereby mapping it to instructions of the underlying processing circuitry 110. Alternatively, the Java bytecode can be compiled further for the processing circuitry 110 using a Just-in-Time (JIT) compiler. Note that although FIG. 1 shows a Java Virtual Machine (JVM), in other embodiments the Virtual Machine may not be Java-based but instead the Virtual machine may run platform-neutral program code other than Java program code.

The computer system 100 of FIG. 1 is a standard personal computer. However, it will be appreciated that the computer system 100 could be a workstation, a network computer, a mini computer, a main frame computer or any other suitable computing device. The computer system 100 could even be an embedded system such as a hand-held device or any other device including processing circuitry and control software 130, 142.

It will be appreciated that the underlying processing circuitry 110 of the computer system of FIG. 1 is involved in executing the instructions of the Java application via the Java Virtual Machine 142. However, the Java Virtual Machine 142 is an abstraction comprised of software. The processing circuitry 110 of the computer system 100 can nevertheless be considered to comprise:

accessing circuitry for accessing platform-neutral program code corresponding to representation of at least one processing function in a function repository associated with the Virtual Machine;

executing circuitry for executing the processing task on the Virtual Machine using the platform-neutral program code;

analysis circuitry for analysing at a current execution point the least one processing function on a function-by-function basis to identify an inactive function; and unloading circuitry arranged to enable the Virtual Machine to perform unloading from the function repository of at least a portion of the platform-neutral program code corresponding to the identified inactive function; and (optionally)

reloading circuitry for reloading of said unloaded portion of platform-neutral program code upon execution of said inactive function by said virtual machine.

Figure 2:
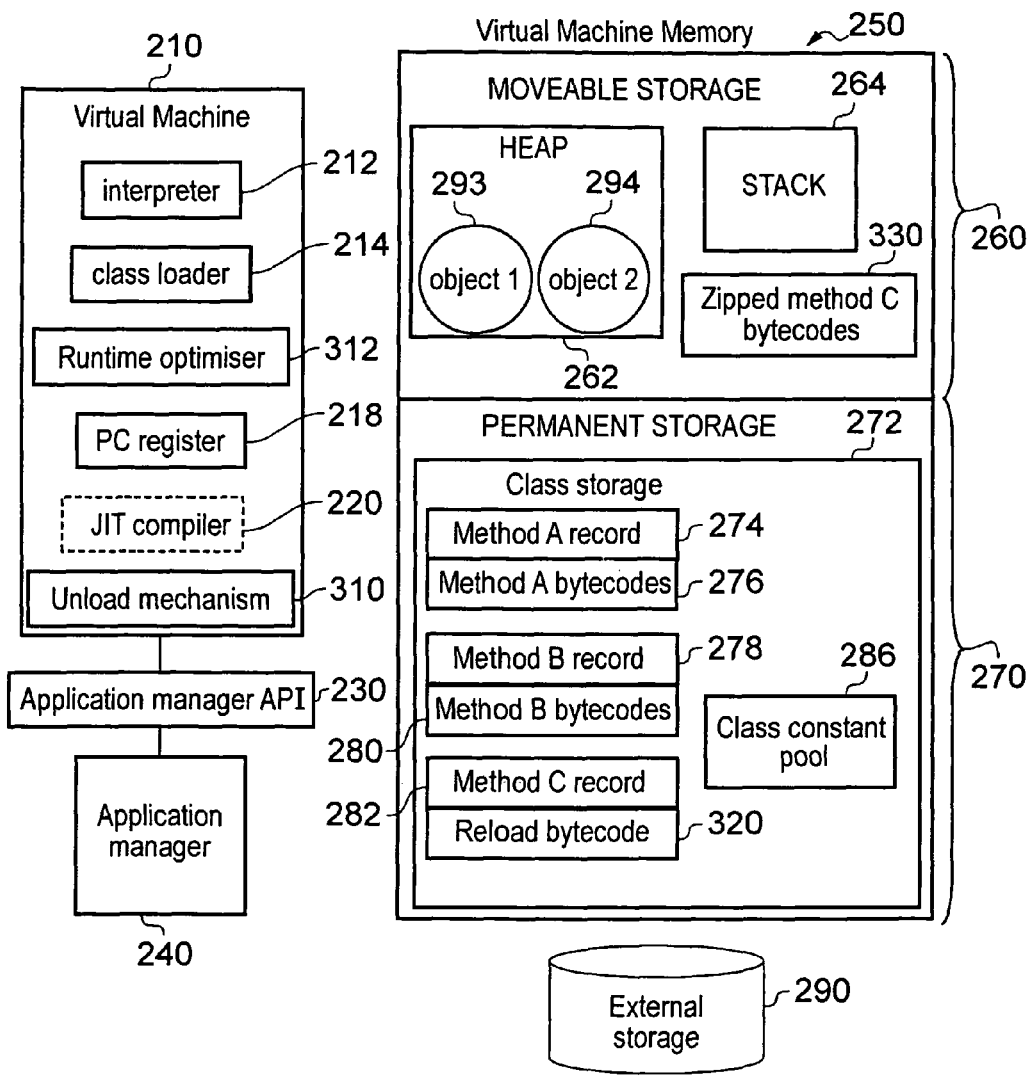
FIG. 2 schematically illustrates an implementation of a Virtual Machine comprising an unloading mechanism according to an embodiment of the present invention.

FIG. 2 schematically illustrates an implementation of a Virtual Machine according to an embodiment of the present invention. The arrangement of FIG. 2 comprises a Virtual Machine 210 having an interpreter 212, a class loader 214, a program counter register 218 and a just-in-time compiler 220.

The Virtual Machine 210 is accessible to the underlying computer system via an application manager 240 which accesses the Virtual Machine 210 via an application manager API (Application Programmers Interface) 230. The Virtual Machine 210 has an associated Virtual Machine memory 250. The Virtual Machine memory 250 comprises a moveable (or non-permanent) storage portion 260 and a permanent storage portion 270. The permanent storage portion is a region of memory in which storage locations cannot be re-allocated dynamically. The moveable storage portion 260 comprises a heap memory 262 and a stack memory 264. The permanent storage 270 comprises a class storage region 272 comprising a plurality of method records 274, 278, 282 and associated method bytecode storage regions 276, 280, 320. However, as will be explained more fully below, the bytecode storage region 320 of Method C no longer contains the associated method bytecodes. Note that FIG. 2 represents a snapshot in time of the Virtual Machine 210 while executing an application comprising Methods A, B and C. The class storage region 272 further comprises a class constant pool 286 associated with a given Java class. The class constant pool 286 stores information about class attributes and is used for example, for dynamic linking. Note that, in general, a Java class comprises a plurality of associated methods and in the particular example of FIG. 2 a single class is illustrated having associated method A, method B and method C. Data is loaded into the permanent storage area 270 of the Virtual Machine memory from class files in an external storage medium 290.

The fundamental unit of a Java computer program is the class and thus in order to run a Java application, the Java Virtual Machine 142 first loads the Java classes and associated methods forming and required by that program application. The classes are loaded into the class storage area 272 from the external storage 290. In previously known Java Virtual Machine implementations the lower bound for the memory use of a Java application at any point is no lower than the storage required to store all Java classes needed up to a given execution point. Thus in previously known systems all of the classes required up to the current execution would be loaded in the class storage area 272. The class loader 214 loads class data comprising mainly executable code plus some information with regard to the class into the class storage region 272. After class loading, when a Java object is needed, then memory for that object is reserved on the heap 262. Two Java program objects 292, 294 are shown in the heap 262 of FIG. 2. Java objects represent instances of a class and the objects are created using the class in class storage region 272 as a template for the object. Accordingly, there is a single copy of the class data i.e. bytecodes etc in the class storage region 272, but potentially a plurality of instances of that class (i.e. a plurality of objects 292, 294) residing on the heap 262. The objects 292, 294 in the heap 262 each contain a reference to their associated data such as the associated method bytecode in the class storage area 272.

The interpreter 214 interprets Java bytecodes one instruction at a time mapping the Java bytecodes into native program instructions that can be executed by the processing circuitry of the host computer system. Instead of executing a Java application via the interpreter 212, an alternative is to make use of the just-in-time compiler 220 which instead of handling the bytecode one instruction at a time compiles the bytecode into native program code executable by the underlying hardware without interpretation. Once the bytecode has been recompiled by the just-in-time compiler it is likely to run more quickly on the whole system. The just-in-time compiler 220 is used optionally to compile the Java bytecode into platform-specific executable code that is immediately executed. The just-in-time compiler is likely to be more efficient if the method executable code is to be repeatedly reused by a program application.

Each Java application may comprise a plurality of threads of execution and the program counter register 218 is used to keep track of the current thread of execution. The program counter register 218 contains the address of some bytecode instruction in the class storage region 272. After a given bytecode instruction has been executed, the program counter register 218 will contain the address of the next instruction to execute. After execution of a given instruction the Java Virtual Machine will ordinarily set the program counter to the address of the instruction that immediately follows the previously executed instruction, unless the previously executed instruction specifically requires a jump in the flow of execution. Occasionally the Virtal Machine 210 will interrupt the thread of execution to set the program counter to the next bytecode to execute in another thread of execution. The Viatal Machine 210 maintains information about each suspended thread so that it can resume execution at the correct point when the thread is resumed.

The stack 264 is used to store parameters for and results of bytecode instructions, to pass parameters to and return values from Java methods and to keep the state of each method invocation. The state of a method invocation is called its "stack frame".

As explained above, the heap 262 is where the objects of a Java program live. Any time memory is allocated by the "new operator" of the Java programming language, that memory comes from the heap 262. The Java programming language does not allow allocated memory to be directly freed by a programmer. Instead, the Java run time environment keeps track of the references to each object currently on the heap 262 and automatically frees the memory occupied by objects that are no longer referenced. This process is called garbage collection. Only the heap 262 is garbage collected.

Note that many different implementations of a Java Virtual Machine are possible, but in the particular implementation of FIG. 2, the Virtual Machine memory is divided into the movable storage region 260 and the permanent storage region 270. Data in the permanent storage region 270 cannot be moved around whereas data in the movable (non-permanent) storage area 260 can be moved around i.e. dynamically re-allocated as required. In this particular implementation the permanent storage region 270 contains the class storage area 272 but not the stack 264. Since the stack areas can change as the program is executed, the stack is associated with the moveable storage region 260 as is the garbage-collected heap 262.

The just-in-time compiler 220 is arranged to be capable of performing dynamic recompilation, which involves recompiling portions of a Java application program during execution. By recompiling during execution, the computer system can tailor the generated code to reflect the programs run-time environment. This offers the possibility of generating code having improved efficiency by exploiting information that would not be available to a traditional static compiler, which performs compilation in advance of execution of a program. The just-in-time compiler 220 may well unload compiled versions of portions of a Java application program i.e. may unload compiled native program instructions. However, the just-in-time compiler 220 typically keeps the original bytecode version loaded within the class storage region 272.

The Virtual Machine implementation of FIG. 2 further comprises an unload mechanism 310; a run time optimiser 312; a reload bytecode 320 and a portion of unloaded method bytecodes 330 stored in the moveable storage region 260 of the Virtual Machine memory 250.

The Virtual Machine implementation according to the embodiment of FIG. 2 comprises both a Virtual Machine mechanism used to perform a software-unload of bytecodes (or partially compiled code) corresponding to inactive methods and a virtual machine function to reload the unloaded methods. The unload mechanism 310 is provided as part of the Virtual Machine 210. The unload mechanism 310 is accessible to the application manager via the application manager API 230.

In this particular implementation, the reloading mechanism is provided via a custom-defined bytecode, the reload bytecode 320, which is stored in the class storage region 272 of the Virtual Machine memory. The reload bytecode is loaded into the class storage region 272 to replace any method bytecode or portion thereof that has been unloaded. The custom-defined reload bytecode provides the Virtual Machine 210 with the ability to reload previously unloaded platform-neutral program code.

In this particular example, the class storage region comprises data for method A, method B and method C of a given Java class. However the method C bytecodes have been unloaded in their entirety and replaced by the single custom-defined reload bytecode 320. In alternative implementations only a portion of bytecodes corresponding to a given method are selectively unloaded.

In the arrangement of FIG. 2 the method C bytecodes have been compressed by a compression algorithm (i.e. have been zipped) and have been unloaded from the class storage region 372 for storage in the movable storage region 260 as the zipped method C bytecode file 330. Replacement of the method C bytecodes in the class storage region 372 by the single custom-defined reload bytecode 320 frees up space in the class storage region 272 for use by the Virtala Machine. This enables the usage of permanent storage by a given program application to be reduced.

In the implementation of FIG. 2 the unload mechanism 310 is accessible to the application manager 240 via a call to the Java application manager API 230. Accessibility via the API call allows the implementer of the application manager 240 to customise when the unloading is performed based on information with regard to execution patterns of specific program applications to be run. This reduces any impact of the unloading and reloading of method bytecode on overall processing efficiency. The selective unloading of bytecodes enables the memory footprint of long-running idle applications to be reduced so that the reclaimed space in the permanent storage region 270 can be readily re-used for non-idle code. The unloaded method C bytecodes of FIG. 2 can be alternatively stored in external storage 290 such as flash memory.

The Virtual Machine 210 according to the embodiment of FIG. 2 comprises the run-time optimiser 312. This run-time optimiser 312 takes the original bytecode methods (or functions) which were loaded into the class storage region 272 and creates at least one additional copy of the corresponding function with optimised bytecodes. The run time optimiser 312 differs in operation from just-in-time compilers in that it outputs optimised bytecode (i.e. platform-neutral program code) rather than optimised native code (i.e. platform-dependent program code). Note that in this description by "optimise" we mean improve rather than make optimal. It will be appreciated that the unload mechanism 312 is capable of unloading not only initially loaded method bytecodes but is also capable of unloading optimised versions of bytecodes generated by the run time optimiser 312. Either original versions or optimised versions of method bytecodes can be reloaded into the class storage region 272. The class storage region 272 of FIG. 2 serves as a function repository from which the platform-neutral program code is loaded and reloaded. In the FIG. 2 embodiment, the runtime optimiser 312 stores optimised bytecode in the class storage region 272 together with non-optimised bytecode. However, in alternative embodiments the runtime optimiser 312 is arranged to store the optimised bytecode in a different storage location from the non-optimised bytecode. However, even if the optimised bytecode is stored in a different location from the class storage region 272, it is still considered to form part of the function repository and can be unloaded and reloaded from its storage location using the present technique.

In determining which of methods A, B and C are active and which are inactive, the Virtual Machine 210 is arranged to traverse all execution thread stacks in the stack space 264 and to mark all methods that are currently active on the stack. In this case method A and method B are currently active. Next, the Virtual Machine 210 will traverse the class storage region 272 to determine which method bytecodes are currently stored in the class storage region yet do not correspond to currently active methods. In this case, it is determined that method C is not currently active and accordingly, the method C bytecodes (not shown) are unloaded via the unload mechanism 310. Once the method C bytecodes have been unloaded by compressing the method C bytecode and storing them in the movable storage region 260, the marks on the active methods in the stack are cleared ready for a subsequent analysis. The Virtual Machine 210 performs a further check to determine whether there are any classes for which all methods have been unloaded. If all methods of a given class have been unloaded then unloading of additional class information, for example, the class constant pool 286 associated with that class, is also unloaded by the unload mechanism 310. Class information other than (or as well as) the class constant pool 286 may be unloaded provided that it is only likely to be needed by methods which have been unloaded. Thus the flow of events is such that the application manager 240 knows that an application is going into background mode and signals via the application manager API 230 to the Virtual Machine 210 to unload the corresponding inactive function bytecodes. The Virtual Machine traverses the stack 264 for every thread of execution and the unloading of inactive methods is performed by the Virtual machine 210.

Figure 3:
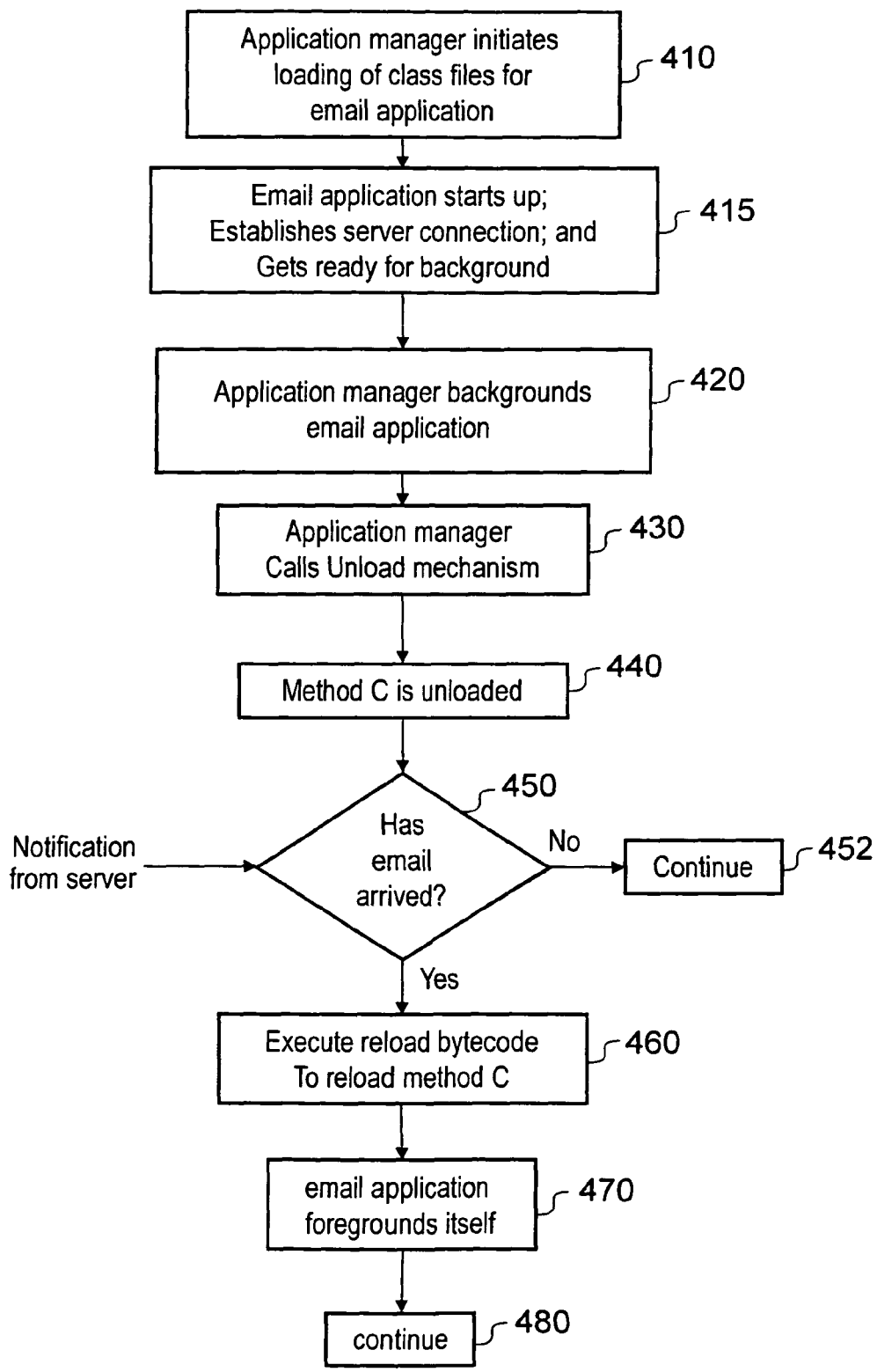
FIG. 3 is a flow chart that schematically illustrates how the application manager of FIG. 2 initiates unloading of bytecodes corresponding to method C.

FIG. 3 is a flow chart that schematically illustrates how the application manager 240 of FIG. 2 initiates unloading of the method C bytecode. In this case, we shall assume that the method C bytecode is associated with an e-mail program application. The process begins at stage 410 where the application manager 240 starts up an email application and the Virtual Machine 210 (in particular, the class loader 214) loads from the external storage 290 all class files associated with a given e-mail application. Then at stage 415, the email application launches, establishes a connection to the server and gets ready for going into background. Next at stage 420 the application manager backgrounds the e-mail application to give priority to another processing task in the Java Virtual Machine. The process then proceeds to stage 430 whereupon the application manager accesses the unload mechanism 310 of the Virtual Machine via a call to the application manager API 230. The Virtual Machine 210 subsequently determines (as described above) by traversing the stack that method C is associated with the e-mail application and that method C is currently inactive. Accordingly, at stage 440, method C bytecodes are unloaded via the unload mechanism 310.

Once the bytecode of method C has been unloaded, the process proceeds to stage 450 where the email application performs a rung check on whether or not an e-mail has arrived. If no e-mail has arrived then the e-mail application remains in background and the process continues (at stage 452) to execute any foreground application programs.

However, if at stage 450 it is determined that an e-mail has arrived, then the process proceeds to stage 460 where the e-mail application triggers invocation/execution of the reload bytecode 320 to reload the bytecode corresponding to method C from the movable storage region 260 back into the class storage region 272 (see FIG. 2). Thus reloading of the unloaded bytecode is performed automatically when the unloaded function (in this case a method of the email application) is called. Accordingly, no extra monitoring (and no extra overhead) is required to trigger reloading. Once the reloading has been performed, the process proceeds to stage 470 where the e-mail application foregrounds itself and proceeds by executing the reloaded method C bytecodes as required. The processing then continues at stage 480.

The flow chart of FIG. 3 illustrates a common situation in a multi-application Virtual Machine, in which it is possible to run long-lived applications in the background rather than to start them up and shut them down again. In the particular example of FIG. 3 the e-mail application lives in the background maintaining a connection to an e-mail server and the e-mail application foregrounds itself only when the server notifies it that an e-mail has been received. Such e-mail applications typically have long start-up times, for example, due to requiring an intricate hand shaking protocol to establish an e-mail client connection to the server. However, once the connection has been established, the e-mail application typically uses a fraction of the Java program code that comprises the e-mail application. Accordingly, by using the unloading mechanism according to the present technique to unload a portion of the bytecode of the e-mail application (e.g. the method C bytecodes of FIG. 2), it becomes possible to run the virtual machine using less permanent storage. This is achieved by selectively unloading method bytecodes of the e-mail application when the e-mail application is in background mode and only reloading them as and when required.

Figure 4:
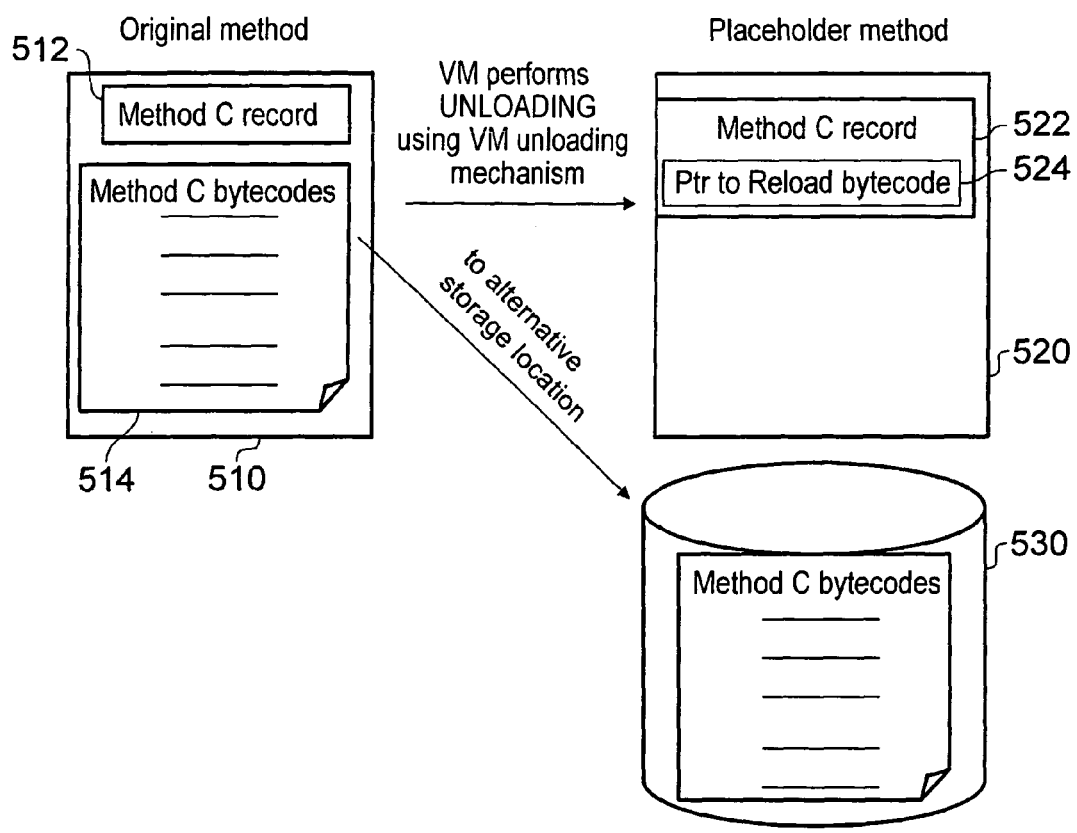
FIG. 4 schematically illustrates the unloading mechanism according to an embodiment of the present invention.

FIG. 4 schematically illustrates the unloading mechanism according to an embodiment of the present invention. The arrangement of FIG. 4 comprises an original method data structure 510 as initially loaded into the class storage region 272 of the Virtual Machine memory 250 of FIG. 2. The original method data structure 510 comprises a method C record 512 and associated method C bytecodes 514. The arrangement also comprises a placeholder method data structure 520 comprising a method C record 522 and a pointer to a reload bytecode 524. An alternative storage location 530 for storage of unloaded bytecodes is also illustrated.

As shown in FIG. 4, execution of the unloading mechanism 310 of FIG. 2 (part of the Virtual Machine) results in the method C bytecodes 515 being stripped from the method data structure of the class storage region 272 and stored in the alternative storage location 530 (such as flash memory or to a region of moveable storage within in the Virtual Machine). In alternative embodiments the unloaded platform-neutral program code is discarded and later reloaded from a class file known not to have changed since the initial loading. Following execution (running) of the unloading mechanism, the placeholder method data structure 520 is left. This includes the method C record 522, which has been modified to include a pointer 524 to the reload bytecode of the Virtual Machine. The method records 512, 522 do not contain the bytecodes corresponding to the method, but do contain information about the method and information about the class to which the method belongs. During execution of the unloading mechanism, the method record 512 of the original method is modified such that the pointer of the method record points to a single custom bytecode that is capable of reloading the full body of the method 514. Accordingly, the process of unloading effectively replaces all of the unloaded method bytecodes 514 with the same custom-defined reload bytecode, while retaining information about the unloaded method in the method record.

Figure 5:
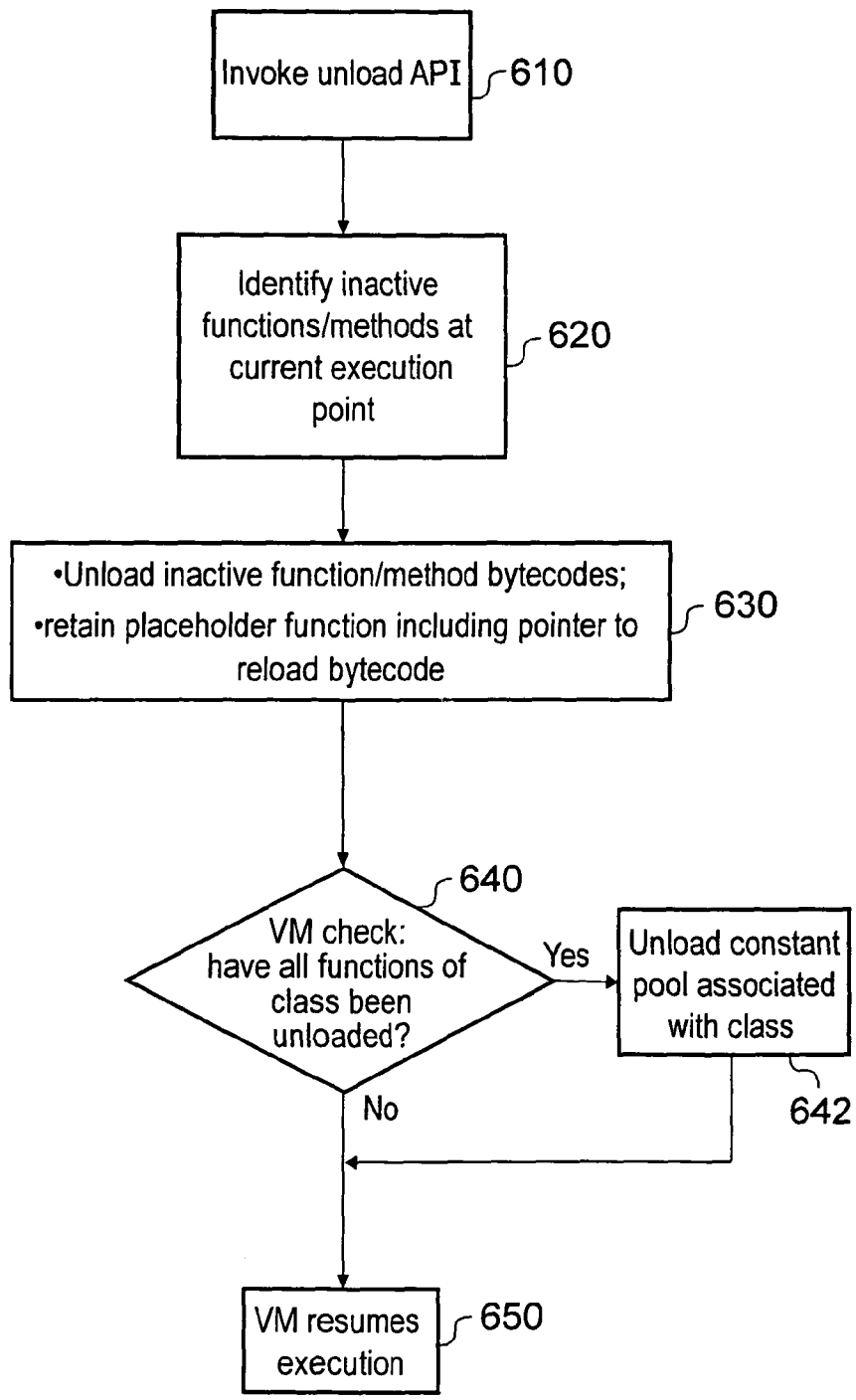
FIG. 5 is a flow chart that schematically illustrates function unloading according to an embodiment of the present invention.

FIG. 5 is a flow chart that schematically illustrates function unloading according to an embodiment of the present invention. The process begins at stage 610 where the application manager 240 accesses the software-based unload mechanism 310 (see FIG. 2) of the Virtual Machine via the application manager API 230 thereby triggering unloading. Next, the process proceeds to stage 620 where the Virtual Machine 210 of FIG. 2 identifies any inactive functions/methods at a current execution point. Next at stage 630 the bytecodes of the inactive function are unloaded from the class storage region 272 (i.e. unloaded from the function repository) and stored in an alternative location, for example, the movable storage region 260 or in an external storage 290. Alternatively, the unloaded bytecodes are discarded, to be reloaded from the unchanged class file from which the function was originally loaded. A placeholder function including a pointer to a reload bytecode is retained in place of the unloaded method. Next, at stage 640, the Virtual Machine performs a check to determine if all of the functions of a given class have been unloaded. If at stage 640 it is determined that all functions of a corresponding class have in fact been unloaded then the process proceeds to stage 642 where the associated class constant pool 322 (and possibly further class information which would only be needed by the unloaded functions) is also unloaded. Finally at stage 650 the Virtual Machine 210 (see FIG. 2) resumes execution. Note that execution can continue indefinitely without reloading if the unloaded method is not subsequently invoked by the Virtual Machine 210. However, FIG. 6 schematically illustrates what happens if an unloaded function is in fact invoked.

Figure 6:
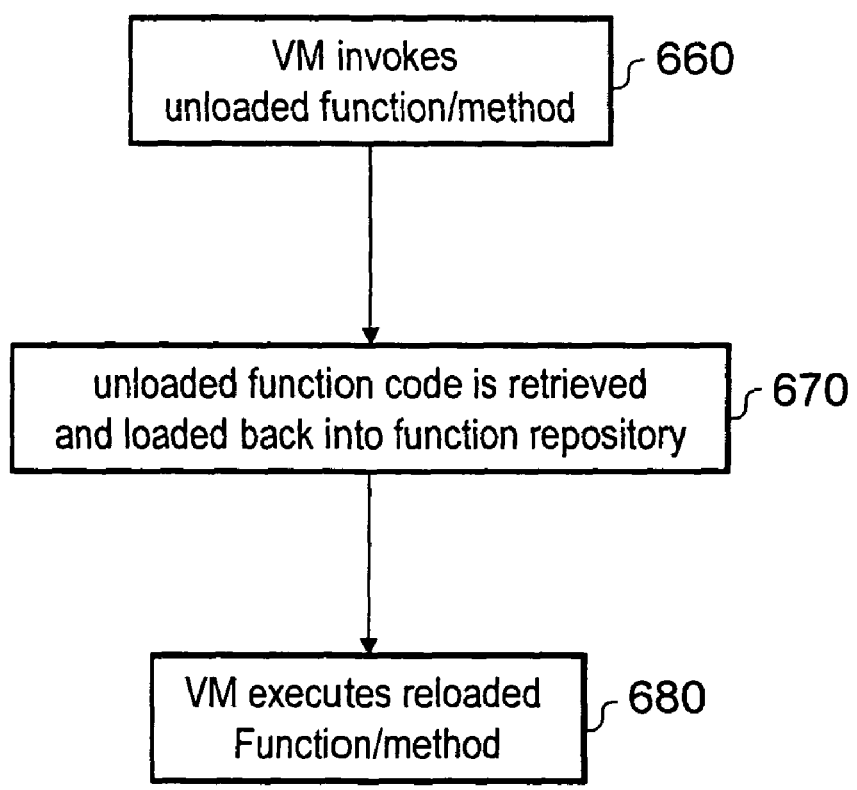
FIG. 6 is a flow chart that schematically illustrates a sequence of events following execution of an unloaded function.

FIG. 6 is a flow chart that schematically illustrates a sequence of events following execution of an unloaded function. The process begins at stage 660 where the Virtual Machine 210 invokes the unloaded function. Next, at stage 670 the Virtual Machine 210 automatically retrieves the unloaded method bytecodes either from the alternative storage location to which it was unloaded or from the original (unchanged) class file if the bytecodes were discarded upon unloading. Finally, at stage 680, the Virtual machine 210 executes the newly reloaded function. Although FIG. 6 shows reloading of method bytecodes upon invocation of the method, in an alternative arrangement, the platform-neutral program code of a given function is reloaded before invocation of the given function and is triggered by invocation of a related function. For example, if a class has five associated methods, three of which have been unloaded, the virtual machine can be configured such that the reloading mechanism reloads all three unloaded methods of the class when any one of the unloaded methods is called (i.e. invoked).

Figure 7:
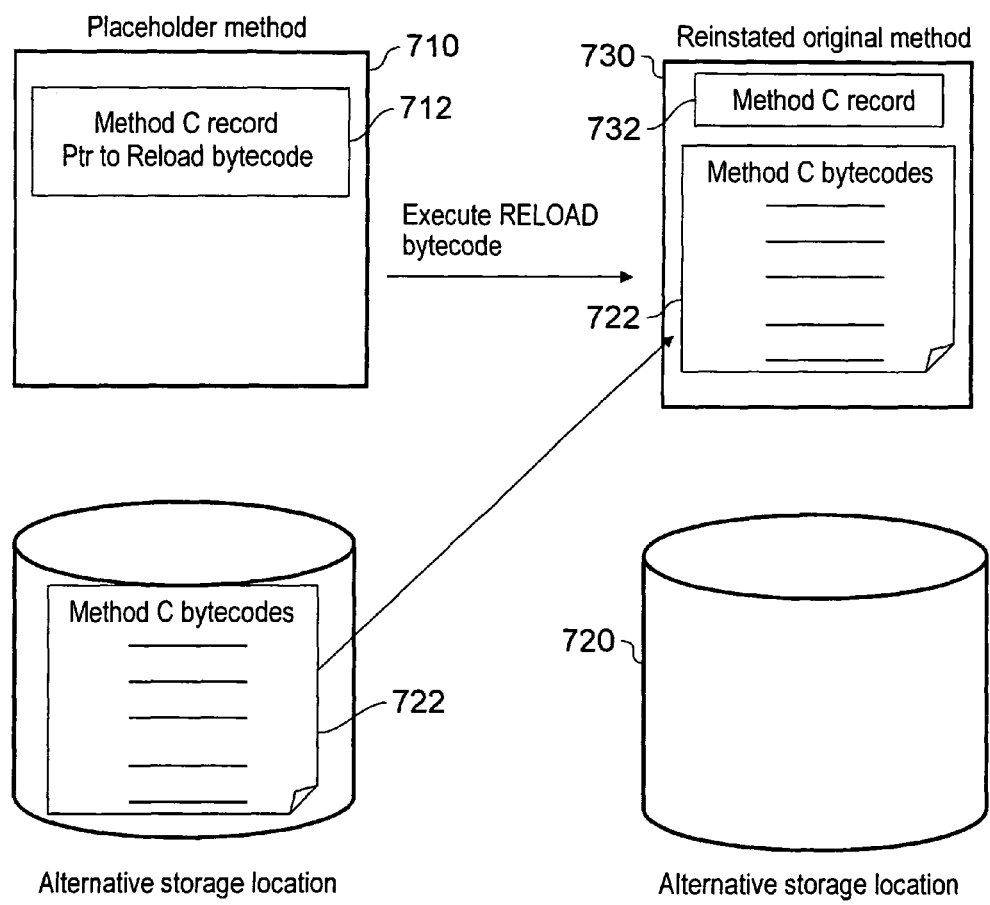
FIG. 7 schematically illustrates an implementation of a function/method reload mechanism according to an embodiment of the present invention.

FIG. 7 schematically illustrates an implementation of a function/method reload mechanism according to an embodiment of the present invention. The arrangement of FIG. 7 comprises a placeholder function 710 comprising a method record 712 having a pointer to the reload bytecode; a reinstated original method 730 comprising a method C record 732 and a full set of method C bytecodes 722; an external storage repository 720 initially comprising a copy of a full set of method C bytecodes 722.

The reload mechanism involves execution of the reload bytecode, which (as shown in FIG. 2) effectively replaces the unloaded method C bytecode.

Note that as an alternative to replacing the unloaded method bytecode with a custom-defined reload bytecode, the method bytecode can be replaced by a call to a native method written in a different programming language such as the C programming language and compiled into the Virtal Machine. Execution of the native method performs the reload in the same way as the reload bytecode.

The placeholder function 710 of FIG. 7 is what remains in the class storage region 272 following unloading of the method C bytecode i.e. the placeholder function comprises information about method C (the inactive function) but not the platform-neutral bytecode. The placeholder function 710 is retained by the virtual machine to facilitate reloading along with the reload mechanism. Accordingly, the method C record 712 comprises a pointer to the custom reload bytecode. Upon invocation of method C by the virtual machine 210, the reload bytecode 320 (a pointer to which was left in place of the unloaded method bytecodes) is executed and reinstates the method C bytecodes by retrieving them from the alternative storage location 720 and inserting them back into the class file to form the reinstated original method file 730. The reinstated original method file 730 comprises the original method C record 732, which has no pointer to the reload bytecode and the original method C bytecode 722. Thus it can be seen that, following execution of the reload bytecode, the method C bytecodes can be removed from the alternative storage location 720. In one embodiment of the present invention the Virtual Machine can be modified such that all invoker bytecodes are arranged to check that a method is loaded before it is actually invoked. Thus checks will be performed upon every invoke rather than only upon invokes associated with unloaded methods.

Figure 8:
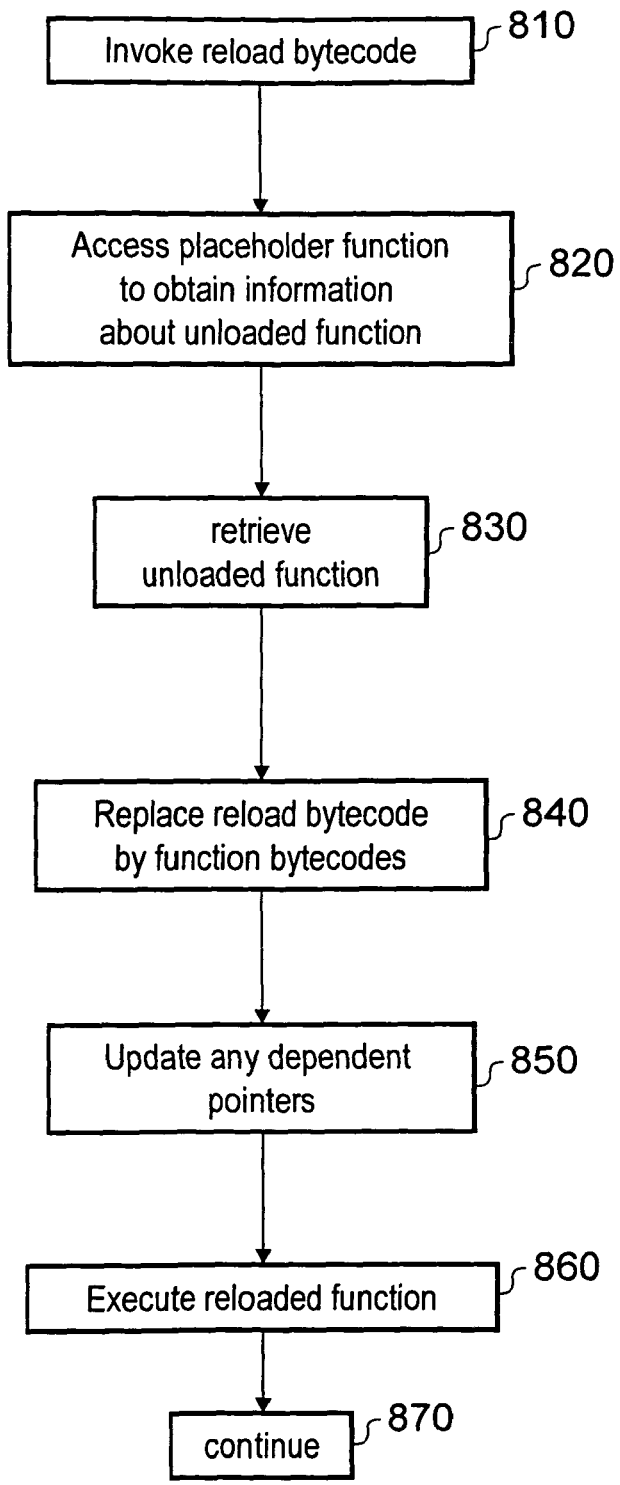
FIG. 8 is a flow chart corresponding to the process of method/function unloading of FIG. 7.

FIG. 8 schematically illustrates a flow chart corresponding to the process of method/function reloading of FIG. 7. The unloaded method C is invoked exactly as a loaded method would have been, but, the process begins at stage 810 where the custom reload bytecode is invoked. Invocation of the custom reload bytecode causes the process to proceed to stage 820, where the placeholder function 710 is accessed within the class storage region 272 to obtain information with regard to the unloaded function e.g. information about where the unloaded bytecodes are stored i.e. the external storage repository 722. Note that in alternative embodiments to that of FIGS. 7 and 8, the unloaded bytecodes are reloaded from the class file (known to be unchanged since initial loading) or from a compressed file stored in heap (non-permanent) memory. The reload bytecode also performs a check as to whether additional class information such as the class constant pool 322 of the class with which the method is associated has also been unloaded. If so, the class constant pool 322 (and any additional class information that was unloaded) is reloaded prior to any methods. Next, at stage 830, the unloaded bytecodes are retrieved from where they were stored in the unload step, which in this case is from the external storage repository 722. In alternative embodiments where the unloaded method bytecodes are discarded at the unloading step, they are retrieved from the class file (unchanged since initial loading). Next at stage 840, the reload bytecode within the method C placeholder method data structure 710 of the class storage region 272 is replaced by the full set of method bytecodes. Next at stage 850 any dependent pointers, for example, saved instruction pointers in stack frames and thread records, which might still point to the reload bytecode are updated to point to the reloaded method bytecodes. Then at stage 860 the reloaded function is executed and processing continues at stage 870.

FIG. 9 shows benchmarking statistics from an implementation of an embodiment of the present invention. The present technique has been benchmarked using an Embedded Microprocessor Benchmark Consortium (EEMBC) benchmark. EEMBC progresses through several tests, each of which has its own class files and after each test has been run, the class files for that test are mostly not used again. The test consisted of two EEMBC benchmarks, which were run as separate Java applications substantially simultaneously and controlled by a third Java application that served as a test harness. The test was run on an ARM 926 EJ-S processor running at 210 MHz on an ARM RealView Versatile Platform Baseboard. The three applications were run on a computer system comprising a 900 kilobyte heap and method unloading was performed on every compacting garbage collection throughout the lifetime of the two EEMBCs. The scores in the benchmarking results of FIG. 9 reflect the running time. The smaller the score, the better the Virtual Machine performance is. It can be seen that the scores for the two EEMBC applications results in a total score of 280,143 EEMBC score for no unloading, which compares against the total of 286,939 when both method and constant pool unloading were performed. Accordingly, in this case unloading lowers the benchmark score by only around 2.5 percent. It can been seen that the overall running time slows down by about 7 percent. However, the permanent heap space used is reduced quite significantly when the unloading is performed compared to when no unloading is performed. In the simulations in which method unloading was performed by the Viatal Machine, a total of 18 method unloads were performed during the test run and this resulted in 901 methods and 72 constant pools in 116 classes having to be unloaded.

The scores of the benchmarking of FIG. 9 show that even with some reloading, performance of the Virtual Machine is likely to be within an acceptable range of Virtual Machines that perform no unloading. It is expected that for applications such as background e-mail applications that are particularly suited to application of this technique the adverse performance impact of performing of implementing reloading is likely to be much less. The reduction in the requirements of usage of heap memory imply that the present technique can be effectively used to allow a given set of program applications to run with the smaller memory footprint.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of performing a processing task in a data processing apparatus that reduces memory usage of said processing task, said processing task being performed using a virtual machine associated with said data processing apparatus, said processing task comprising at least one processing function, said method comprising said virtual machine performing the steps of:
   (a) accessing platform-neutral program code corresponding to a representation of said at least one processing function in a function repository associated with said virtual machine;
   (b) executing said processing task on said virtual machine using said platform-neutral program code;
   (c) analysing, at a current execution point, said at least one processing function on a function-by-function basis to identify an inactive function;
   (d) performing software-based unloading, from said function repository, of at least a portion of platform-neutral program code corresponding to said inactive function, wherein said virtual machine is configured to determine, when performing said software-based unloading, whether all functions of a class to which said inactive function corresponds have been unloaded, and, when said virtual machine determines that all of said functions of said class have been unloaded, said virtual machine initiates software-based unloading of class information corresponding to said unloaded functions; and
   (e) providing a software-based reloading mechanism for reloading of said unloaded portion of platform-neutral program code for execution of said inactive function by said virtual machine, wherein said software-based reloading mechanism is configured to check whether said class information corresponding to said unloaded functions associated with said class is present in said function repository and to initiate reloading of said class information if said class information is determined not to be present in said function repository prior to execution of a corresponding unloaded function.

2. A method as claimed in claim 1, wherein said virtual machine comprises a run-time code modifier arranged to generate modified platform-neutral program code for performing a given processing function and wherein said function repository comprises storage for said modified platform-neutral program code.

3. A method as claimed in claim 2, wherein said software-based unloading comprises unloading, from said function repository, of at least a portion of said modified platform neutral program code generated by said run-time code modifier.

4. A method as claimed in claim 2, wherein said modified platform-neutral program code corresponds to a run-time optimised version of said given processing function.

5. A method as claimed in claim 1, wherein said function repository is stored in memory allocated to said virtual machine.

6. A method as claimed in claim 5, wherein said software-based unloading comprises unloading to a memory external to said data processing apparatus.

7. A method as claimed in claim 6, wherein said external memory is flash memory.

8. A method as claimed in claim 5, wherein said software-based unloading comprises unloading to an unloading-region of memory associated with said virtual machine.

9. A method as claimed in claim 8, wherein said unloading-region is a storage region of memory that is dynamically re-allocatable.

10. A method as claimed in claim 1, wherein said virtual machine is configured to discard said at least a portion of platform-neutral program code corresponding to said inactive function when performing said software-based unloading and wherein said reloading mechanism is configured to reload further platform-neutral program code corresponding to said inactive function from a class file from which said at least a portion of platform-neutral program code was originally loaded into said function repository.

11. A method as claimed in claim 1, wherein said software-based unloading comprises a step of compression of said at least a portion of platform-neutral program code corresponding to said inactive function.

12. A method as claimed in claim 1, wherein said data processing apparatus comprises an application manager associated with said virtual machine and wherein said data processing apparatus is configured such that said software-based unloading is accessible to said application manager via an Application Program Interface between said virtual machine and said application manager.

13. A method as claimed in claim 1, wherein said software-based unloading is performed such that a placeholder function corresponding to said inactive function is retained within said function repository.

14. A method as claimed in claim 13, wherein said placeholder function comprises information for use in reloading platform-neutral program code of said inactive function.

15. A method as claimed in claim 14, wherein said placeholder function comprises a pointer to a reload function for reloading said unloaded portion of said inactive function.

16. A method as claimed in claim 15, wherein said reload function comprises a call to a native function comprising program code native to said data processing apparatus.

17. A method as claimed in claim 15, wherein said reload function comprises platform-neutral program code.

18. A method as claimed in claim 17, wherein said reload function comprises a single custom-defined bytecode for enabling said virtual machine to reload said unloaded portion of said inactive function.

19. A method as claimed in claim 13, wherein said software-based reloading mechanism is configured to retrieve said unloaded portion of platform-neutral program code and to replace said placeholder function by said retrieved code.

20. A method as claimed in claim 19, wherein said software-based reloading mechanism retrieves said unloaded portion of platform-neutral program code from a location corresponding to a location from which it was originally loaded into said function repository.

21. A method as claimed in claim 1, wherein said class information comprises a constant pool corresponding to said class.

22. A method as claimed in claim 1, wherein said reloading mechanism is configured to automatically reload said unloaded portion of platform-neutral program code upon invocation of said inactive function at an execution point subsequent to said software-based unloading being performed.

23. A method as claimed in claim 1, wherein said virtual machine is configured to perform a further check that a function associated with said function repository is currently loaded in said function repository prior to invoking said function and to invoke said reloading mechanism if said further check determines that said function is not currently loaded in said function repository.

24. A method as claimed in claim 23, wherein said virtual machine is configured to perform said further check for each invoked function.

25. A method as claimed in claim 1, wherein said virtual machine is configured to perform said software-based unloading for at least a portion of platform-neutral program code corresponding to an entire inactive class having a plurality of inactive functions.

26. A computer program product including a non-transitory computer readable storage medium, said storage medium bearing a computer program for controlling a computer to perform the method of claim 1 in order to reduce memory usage of a processing task within a data processing apparatus.

27. A data processor comprising a virtual machine arranged to perform a processing task having at least one processing function whilst reducing memory usage of said processing task, said virtual machine comprising:
 (a) function-repository accessing code for accessing platform-neutral program code corresponding to a representation of said at least one processing function in a function repository associated with said virtual machine;
 (b) invoker code for invoking execution of said processing task on said virtual machine using said platform-neutral program code;
 (c) analysis code for analysing, at a current execution point, said at least one processing function on a function-by-function basis to identify an inactive function;
 (d) function unloader code for performing software-based unloading, from said function repository, of at least a portion of platform-neutral program code corresponding to said inactive function; and
 (e) reloading code providing a software-based reloading mechanism for reloading of said unloaded portion of platform-neutral program code upon execution of said inactive function by said virtual machine,
 wherein said virtual machine is configured to determine, when performing said software-based unloading, whether all functions of a class to which said inactive function corresponds have been unloaded, and, when said virtual machine determines that all of said functions of said class have been unloaded, said virtual machine initiates software-based unloading of class information corresponding to said unloaded functions; and
 wherein said software-based reloading mechanism is configured to check whether said class information corresponding to said unloaded functions associated with said class is present in said function repository and to initiate reloading of said class information if said class information is determined not to be present in said function repository prior to execution of a corresponding unloaded function.

28. A data processing apparatus for performing a processing task whilst reducing memory usage of said processing task, said processing task being performed using a virtual machine associated with said data processing apparatus, said processing task comprising at least one processing function, said apparatus comprising:
 (a) accessing circuitry configured to access platform-neutral program code corresponding to a representation of said at least one processing function in a function repository associated with said virtual machine;
 (b) execution circuitry configured to execute said processing task on said virtual machine using said platform-neutral program code;
 (c) analysis circuitry configured to analyse, at a current execution point, said at least one processing function on a function-by-function basis to identify an inactive function;
 (d) unloading circuitry configured to enable said virtual machine to perform unloading, from said function repository, of at least a portion of platform-neutral program code corresponding to said inactive function; and
 (e) reloading circuitry configured to reload said unloaded portion of platform-neutral program code upon execution of said inactive function by said virtual machine;
 wherein said virtual machine is configured to determine, when performing said unloading, whether all functions of a class to which said inactive function corresponds have been unloaded, and, when said virtual machine determines that all of said functions of said class have been unloaded, said virtual machine initiates unloading of class information corresponding to said unloaded functions; and
 wherein said reloading circuitry is configured to check whether said class information corresponding to said unloaded functions associated with said class is present in said function repository and to initiate reloading of said class information if said class information is determined not to be present in said function repository prior to execution of a corresponding unloaded function.

29. A data processing apparatus for performing a processing task whilst reducing memory usage of said processing task, said processing task being performed using a virtual machine associated with said data processing apparatus, said processing task comprising at least one processing function, said apparatus comprising:
 (a) means for accessing platform-neutral program code corresponding to a representation of said at least one processing function in a function repository associated with said virtual machine;
 (b) means for executing said processing task on said virtual machine using said platform-neutral program code;
 (c) means for analysing, at a current execution point, said at least one processing function on a function-by-function basis to identify an inactive function;
 (d) means for enabling said virtual machine to perform unloading, from said function repository, of at least a portion of platform-neutral program code corresponding to said inactive function; and
 (e) means for reloading of said unloaded portion of platform-neutral program code upon execution of said inactive function by said virtual machine;
 wherein said virtual machine is configured to determine, when performing said unloading, whether all functions of a class to which said inactive function corresponds have been unloaded, and, when said virtual machine determines that all of said functions of said class have been unloaded, said virtual machine initiates unloading of class information corresponding to said unloaded functions; and wherein said means for reloading is configured to check whether said class information corresponding to said unloaded functions associated with said class is present in said function repository and to initiate reloading of said class information if said class information is determined not to be present in said function repository prior to execution of a corresponding unloaded function.

* * * * *